United States Patent
Kurtz et al.

[11] Patent Number: 5,165,283
[45] Date of Patent: Nov. 24, 1992

[54] HIGH TEMPERATURE TRANSDUCERS AND METHODS OF FABRICATING THE SAME EMPLOYING SILICON CARBIDE

[75] Inventors: Anthony D. Kurtz, Teaneck; David Goldstein, Edison, both of N.J.; Joseph S. Shor, Flushing, N.Y.

[73] Assignee: Kulite Semiconductor Products, Inc., Leonia, N.J.

[21] Appl. No.: 694,490

[22] Filed: May 2, 1991

[51] Int. Cl.⁵ .............................................. G01L 9/06
[52] U.S. Cl. ..................................... 73/727; 29/621.1; 73/708; 73/721; 73/777; 73/862.474; 338/4
[58] Field of Search .............. 73/721, 727, DIG. 4, 73/777, 708, 862.47, 862.48; 338/4, 42, 47; 29/621.1

[56] References Cited

U.S. PATENT DOCUMENTS 4,320,664  3/1982  Rehn et al. ............................ 73/727
4,994,781  2/1991  Sahagen ................................ 338/42

Primary Examiner—Donald O. Woodiel
Attorney, Agent, or Firm—Arthur L. Plevy

[57] ABSTRACT

There is disclosed an apparatus and structure for a pressure transducer employing silicon carbide and utilizing p-type SiC as a diaphragm with n-type mesa SiC force sensing resistors integrally formed on the surface of the diaphragm. The p-type SiC diaphragm is positioned on top of an annular ring of silicon which is formed from a silicon wafer utilized as the supporting wafer for the process. The structure depicted is a given conductivity SiC diaphragm having opposite conductivity SiC resistors positioned thereon and fabricated by processing techniques utilizing selective etching properties of SiC.

24 Claims, 3 Drawing Sheets

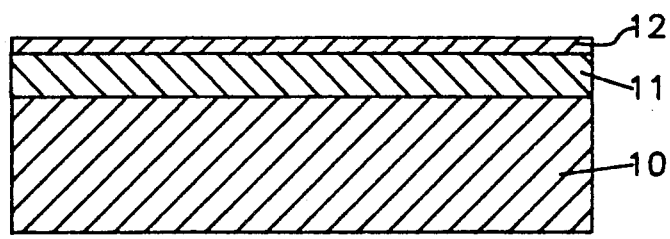
FIG. 1
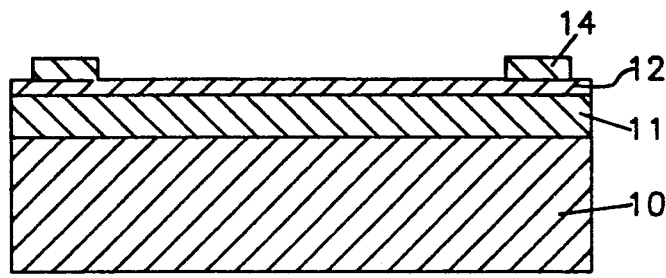
FIG. 2
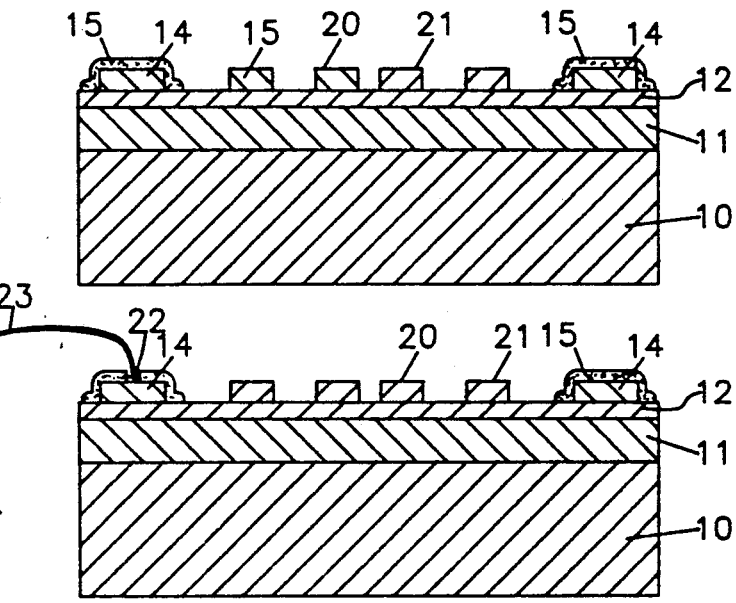
FIG. 3
FIG. 4
FIG. 3A
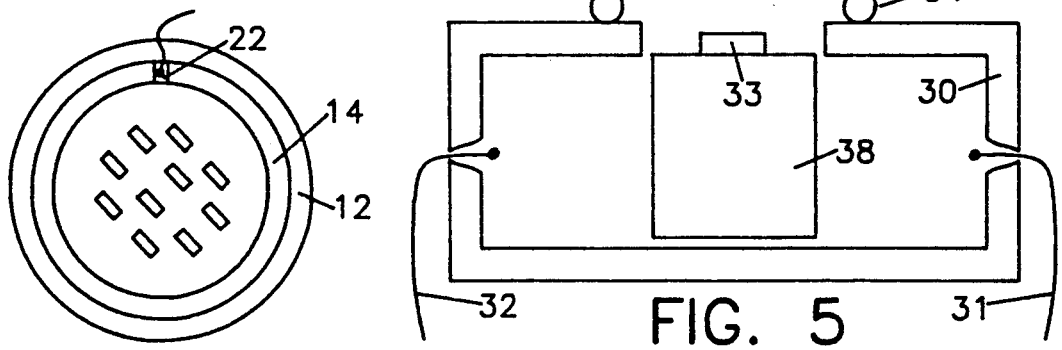
FIG. 5

$$\frac{\delta\rho}{x\rho} = \Pi_{11} \qquad \Pi_{12} \qquad \tfrac{1}{2}(\Pi_{11}+\Pi_{12}+\Pi_{44})$$

HIGH TEMPERATURE TRANSDUCERS AND METHODS OF FABRICATING THE SAME EMPLOYING SILICON CARBIDE

This invention relates to high temperature, pressure transducers and more particularly to methods for fabricating and novel structures associated with such transducers employing silicon carbide (SiC).

BACKGROUND OF THE INVENTION

As one can ascertain from the prior art, there is a need for high temperature operation in regard to pressure transducers. Pressure transducers capable of operating at high temperatures while further being of small physical dimensions are extremely desirable for use in many areas such as satellite applications, nuclear power, chemical processing, aerodynamics, engine testing, and so on. The prior art is replete with many techniques for fabricating such transducers. Certain techniques use organic epoxy adhesive to bond sensors to a metal diaphragm. Other techniques employ monolithic devices which are sensors fabricated integrally with a silicon diaphragm. Such integral configuration permitted higher temperature operation but at temperatures at about 350° F. the isolation between the sensors and the substrate deteriorated. This is caused by thermally generated carriers which serve to short circuit the sensors to the substrate. Hence, in order to circumvent such problems, there were sensors fabricated in the prior art which were dielectrically isolated. For example, see U.S. Pat. No. 3,800,264 entitled HIGH TEMPERATURE TRANSDUCERS AND HOUSING INCLUDING FABRICATION METHODS by A. D. Kurtz et al. and assigned to Kulite Semiconductor Products, Inc., the assignee herein. See also U.S. Pat. No. 3,930,823 issued on Jan. 6, 1976 to A. D. Kurtz et al. and entitled HIGH TEMPERATURE TRANSDUCERS AND HOUSING INCLUDING FABRICATION METHODS. Thus as one can ascertain, previous monolithic piezoresistive pressure transducers which employed silicon stress sensors isolated from the force collecting structure by PN junctions suffer from the problem that the isolation between the stress sensor network and the force collector deteriorates as a function of temperature. The newer class of devices which provide dielectric isolation of the sensor from the diaphragm as, for example, indicated in the above-noted references has provided devices that can operate at temperatures in excess of 500° C. However, above 600° C. the silicon sensing network as well as the silicon force collector, undergo significant plastic deformation rendering the device useless as a pressure transducer.

Hence, it is an object of the present invention to provide a sensor apparatus which is operable at higher temperatures.

It is a further object of the present invention to provide a sensor which provides a higher isolation with temperature as well as capable of operating at higher temperatures before plastic deformation will occur.

BRIEF DESCRIPTION OF THE PREFERRED EMBODIMENT

The present invention employs SiC utilized both as a sensor device and as a diaphragm. The structures and techniques use SiC in order to produce a pressure transducer employing an SiC diaphragm and sensor which transducer is structurally much stronger than prior art silicon devices, exhibits good properties for the ohmic sensing element and is capable of operating at extremely high temperatures greater than 600° C.

BRIEF DESCRIPTION OF THE FIGURES

FIG. 1 is a cross-sectional view of a wafer according to a method of forming a transducer according to this invention.

FIG. 2 depicts the next step in the process of forming a transducer.

FIG. 3 depicts a following step in the process of forming a transducer.

FIG. 3a is a top view of the transducer depicted in FIG. 3.

FIG. 4 is a cross-sectional view of the transducer being formed.

FIG. 5 is a simple schematic diagram depicting a further step.

DETAILED DESCRIPTION OF THE INVENTION

Figure 6:
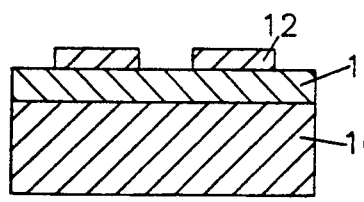
FIG. 6 and FIG. 7 depict a cross-sectional and perspective view of a wafer being processed according to the methods.

Before proceeding with a discussion on how to fabricate a pressure transducer from SiC as well as such a transducer, some reference will be made in regard to the materials. There has been a considerable amount of interest in SiC devices due to recent breakthroughs which have made single crystals of beta SiC ($\beta$-SiC) and alpha SiC ($\alpha$-SiC) available. SiC has a wide bandgap (2.2 eV for $\beta$-SiC and 3 eV for $\alpha$-SiC), a high melting point (2800° C.) and a large thermal conductivity. These factors make SiC an excellent semiconductor for high temperature applications. In addition, SiC is a structurally much stronger material than silicon making it better for high temperature mechanical applications. Several high temperature devices, including a 650° C. MOSFET, have been fabricated in SiC further demonstrating the applicability of this material for high temperatures. See, for example, a reference entitled GROWTH AND CHARACTERIZATION OF CUBIC SIC SINGLE CRYSTAL FILMS ON SILICON by J. Anthony Powell et al. published in "The Journal of Electrochemical Society, Solid State Science & Technology", June 1987, Vol. 134, No. 6, Pages 1558-1565. This article contains an extensive bibliography on approaches using SiC in various applications and for processing SiC. The prior art does not describe a process or a technique of fabricating a monolithic pressure transducer using SiC sensing elements as well as an SiC force collector with PN junction isolation separating the two.

Moreover, there is little if any description in the literature of the piezoresistive coefficient of β-SiC, such information being vital to the design of any transducer.

As a preliminary portion of this discovery, we have had to investigate and determine these coefficients in order to design stress sensors in this material.

Referring to FIG. 1, there is shown a silicon wafer 10 which is of a high resistivity n or p-type but preferably having a (100) crystal axis. Grown on the top surface of the wafer 10 is a layer of p-type β-SiC 11. As will be explained the layer 11 eventually will serve as the force collector or the diaphragm and is typically grown to be between 3-20 micrometers (um) thick. The growth of the β-SiC is typically performed by means of a chemical vapor deposition technique (CVD). Such techniques are well known for growing silicon carbide on silicon wafers, see for example the above-noted article. The doped gas employs trimethyl aluminum. Typically in utilizing such techniques, a silicon substrate is placed on an RF heated SiC coated graphite susceptor which is held in place by a quartz support. Thus the technique for growing β-SiC on the surface of silicon is well known. On top of the layer 11 of β-SiC there is grown a layer of n-type β-SiC which basically is grown on top of the p-type layer. This layer 12 could either be unintentionally doped or a nitrogen dope layer. The growth of this layer is also by a CVD process. CVD growth causes the back of the wafer to be roughened. Hence, the bottom surface of the silicon wafer 10 is roughened and is now polished. The reason for polishing the wafer is that in a subsequent step, the entire composite wafer as shown in FIG. 1 will be E-S bonded to an additional wafer. Essentially at this point in the operation, the formed wafer as shown in FIG. 1 will have to be selectively etched to provide mesa resistor structures on the surface of the wafer. As will be explained, for example, the N layer 12 is treated to produce resistor configurations which essentially are n-type β-SiC. These n-type β-SiC mesa resistors will serve as the sensing elements in the transducer. It is also possible to fabricate the wafer so that a thick n-type β-SiC layer will be grown on the n-type β-SiC layer. In this structure the p-type layer will be selectively etched into mesa resistors, which will then become the sensing elements. We believe that is preferable to use n-type resistors as sensing elements for the following reasons: 1) p-type β-SiC, doped typically with aluminum, has a much higher impurity activation energy than n-type β-SiC. SiC. This will cause the impurities to ionize at higher temperatures for non-degenerately doped p-type SiC, causing a sensor fabricated from p-type β-SiC to have highly nonlinear TCR (temperature coefficient of resistivity) properties. Nonlinear TCR properties will make circuit compensation difficult. 2) Methods for forming ohmic contacts which are necessary for this device are more established in the literature for n-type β-SiC. 3) We have developed a method for etching n-type β-SiC which will not etch p-type β-SiC. Thus n-type β-SiC can be selectively patterned while a p-type underlayer can act as an etch-stop barrier. This process will be very useful for fabricating a transducer. However, no such process currently exists for etching p-type material and stopping at an n-type underlayer. 4) The piezoresistive properties of n-type β-SiC are known to us while those of p-type β-SiC currently are not.

Figure 15A:
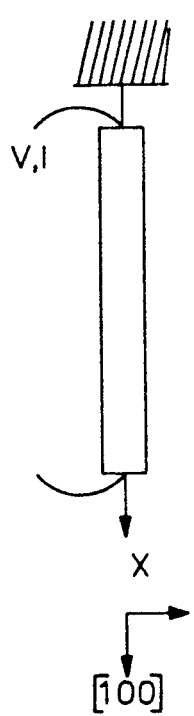
FIGS. 15A-C is a schematic diagram depicting piezoresistors and measurements made thereon.
Figure 15B:
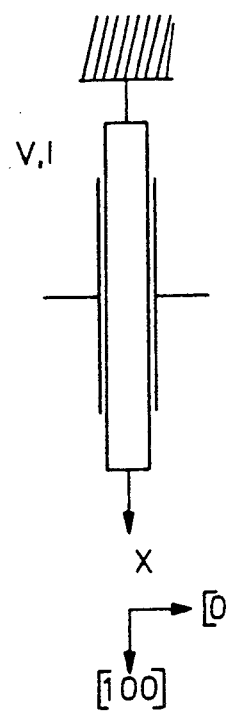
Figure 15C:
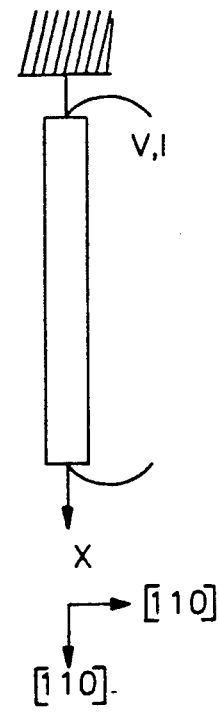

In order to determine the feasibility of β-SiC sensors, we have made a preliminary investigation into the piezoresistive coefficients of n-type β-SiC. Table I shown below delineates the values of the gauge factors of n-type β-SiC in the gauge configurations shown in FIG. 15. It is clear that gauges of configuration "A" have the largest magnitude since $\pi_{11}$ is apparently the largest piezoresistive coefficient of the three. Thus the sensing elements will have the highest output when they are fabricated as Mesa resistors in configuration 'A', and it is advisable that the resistors be longitudinal gauges with their edges in the <100> direction in order to utilize this. However, gauges can be fabricated in other configurations but will yield a lower output.

TABLE I

| | Room temperature gauge factors of β-SiC | | | |
|---|---|---|---|---|
| Material | resistivity (ohm-cm) | $GF_A$ | $GF_B$ | $GF_C$ |
| n β-SiC | 0.7 | −31.8 | +19.2 | −3.7 |
| n+ β-SiC | 0.02 | −26.6 | | |
| n Si | 11.0 | −133.0 | +68.3 | −52.0 |
| corresponding piezoresistive coefficients | | $\pi_{11}$ | $\pi_{12}$ | $\frac{1}{3}(\pi_{11} + \pi_{12} + \pi_{44})$ |

The lower resistivity material has a smaller Gauge factor, but is more constant across the temperature span. This behavior is typical of degenerately doped semiconductors. Thus sensing elements fabricated from epilayers of degenerately doped n-type β-SiC will have the advantage of having a more constant output with temperature and the disadvantage of a lower output compared to lower resistivity types of the same material.

Thus a typical pattern can have longitudinal n-type β-SiC resistors with their edges in the <100> direction on a circular diaphragm in a full bridge configuration as will be further described. The steps of forming the resistors from the n-type β-SiC layer 12 can be implemented by two different techniques which will be described separately. The first technique is referred to as photoelectrochemical etching and a second technique is implemented using reactive ion etching or plasma etching. In order to implement the formation of the resistors using photoelectro- chemistry, the following steps are taken.

Referring to FIG. 2, an aluminum ring or layer 14 is deposited on the surface of the n-type layer of SiC 12. The aluminum or other material forms an ohmic contact with the SiC layer. As shown in FIG. 3, the ring or layer 14 of aluminum is formed about the outer edge of the wafer. The ring 14, as shown in FIG. 3, of aluminum may be deposited around the periphery of the wafer or a grid-like structure may be deposited depending upon the potential drop between the edge and the center of the wafer. If there is a large potential drop, it will cause the etching to be non-uniform. This is because of the fact that the etching depends on the applied potential. Therefore, in certain instances it may be necessary to deposit the aluminum layer 14 in a grid pattern so all parts of the wafer can be accessed. As shown in FIG. 3, a ring or peripheral layer of aluminum 14 is deposited around the outer edge of the wafer. As shown in FIG. 3, the wafer appears to be round in shape but any other shape will suffice. The aluminum must be completely covered by silicon nitride or another masking material which does not react with HF. Even a small amount of aluminum or other HF reactive conductor exposed to the electrolyte will result in the loss of potential control during the etching. As shown in FIG. 3, a layer of SiN is then grown over the aluminum layer. The layer of SiN is designated by reference numeral 50 and is grown over the aluminum layer and furthermore on top of the layer 12 by means of a CVD or sputtering technique. The aluminum must be completely covered by the layer of SiN 15 or another masking material which does not react with the hydrogen fluoride etching material. The SiN layer is patterned using photolithography and the resistor patterns for the wafer will appear in the SiN as shown, for example, in FIG. 3 by reference numerals 20 and 21. It is of course possible that instead of using SiN, a metallic material can be employed which does not react with HF and also forms the ohmic contact with SiC. Thus the metallic material could operate as a masking material and a contacting material and can be utilized instead of aluminum.

As shown in FIG. 4, an opening 22 is made in the layer of silicon nitrite which covers the ring 14. Thus the small window 22 is opened in the SiN layer through which the aluminum 15 is contacted and attached thereto is an external lead wire 23. After this, the exposed aluminum and the conductive lead wire 23 are covered with a wax or another encapsulant. The wax employed can be a typical black wax as used in the semiconductor processing industry and the purpose or use of the wax is to completely cover the aluminum as well as the leads so that there is no exposure of the same to the electrolyte which will be utilized during the etching process.

Figure 7:
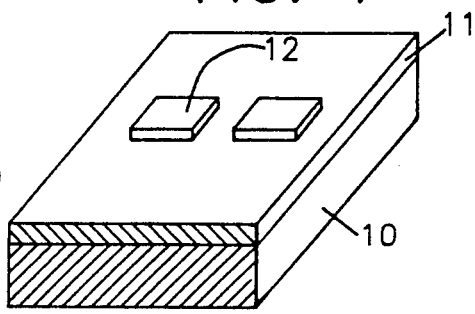

As shown in FIG. 5, the wafer 33 is now placed in an electrochemical cell 30 along with a platinum counter electrode 32 and a saturate calomel reference electrode. The electrolyte used is dilute HF or another solution containing F- ions or a solution that will reduce silicon dioxide $SiO_2$. The potential is controlled by the use of a potentiometer. The n-type layer is selectively etched using photoelectrochemical etching. This process involves illuminating the n-type SiC layer with an intense light beam, preferably UV, while applying an anodic potential to the n-type layer through the external leads described earlier. Dissolution of the n-type $\beta$-SiC will occur in an HF based electrolyte through the anodic oxidation of the SiC and the removal of this oxide by the HF. Etching will take place in illuminated areas that are not masked. In order to etch n-type $\beta$-SiC, the anodic potential must be higher than 0.5 Vsce. It has been determined that p-type $\beta$-SiC will etch only at potentials above 1.4 Vsce. Therefore, below 1.4 Vsce the n-type layer can be selectively removed with the p-type layer acting as an etch stop. This type of conductivity selective etch stopping process is extremely desirable and enables one to selectively etch the SiC to form the transducer. After the etching takes place as shown in FIG. 5, the SiN and Aluminum are stripped using phosphoric acid or any other technique. The etched wafer, for example, is shown in FIG. 6 and FIG. 7. There it is shown that essentially each transducer may consist of two resistors as 12 fabricated from n-type SiC with a diaphragm of p-type SiC 11 on a silicon wafer 10.

Figure 8:
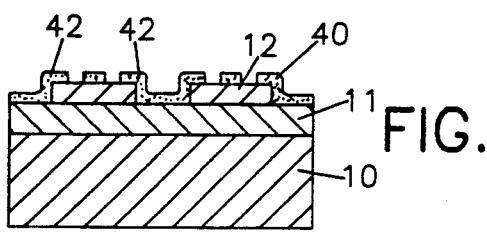
FIG. 8 is a cross-sectional view showing another step in the methods.
Figure 9:
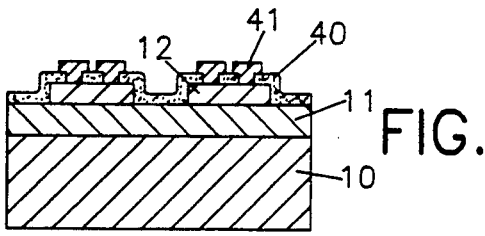
FIG. 9 is a cross-sectional view showing a further step.

Referring to FIG. 8, there is shown the formation of ohmic contacts which serve to contact the force sensing resistors. Essentially the exposed SiC layers 12 are oxidized to between 2000–5000 angstroms of silicon dioxide. The growth of silicon dioxide on SiC is well known. The purpose of the oxide is to form the contact mask and to remove any residue or damage caused by the etching process. Thus a contact pattern is now etched into the silicon dioxide using a conventional buffered oxide etch as shown in FIG. 8. Thus in FIG. 8 holes where the contacts are to be formed are formed in the silicon dioxide by conventional photolithographic etching techniques. The holes are shown as 42. These holes are then filled with a contact metallization which is provided by a sputtering technique. The metal is sputtered onto the silicon dioxide layer after it is patterned. The contact metal systems can use titanium, tungsten or tantalum as the ohmic contact and many different materials as the diffusion barrier and platinum or gold as a conductive layer. The metallization is typically formed and patterned using photolithographic techniques. For example, a metallized wafer is shown in FIG. 9.

We have developed an ohmic contact metallization on n-type $\beta$-SiC that will withstand more than 15 hrs. at 650° C. in air without significant deterioration of the contact resistivity. This contact metallization involves sputtering a layer of Ti, typically 400 A thick directly onto the n-type $\beta$-SiC layer. Following this a layer of Titanium Nitride (typically 1000 A thick) is reactively sputtered onto the Ti layer. Then a layer of Pt (typically 6000 A) is sputtered on top of the TiN and a thin Au layer (300 A) is sputtered on top of the Pt. The Ti layer, when annealed above 350° C. forms TiC, which acts as the ohmic contact to n-type $\beta$-SiC. Ti or TiC, as an ohmic contact to n-type $\beta$-SiC, has been extensively discussed in the literature. The Pt layer is a highly conductive layer which can be accessed by external leads using standard lead bonding techniques. The Au layer makes the lead bonding techniques easier to perform, but is not fundamentally necessary for the metallization system to work. The TiN layer, the fabrication of which is well known in the literature, serves as a diffusion barrier between the Ti and Pt layers. Without the TiN barrier the Ti/Pt/Au metallization system will fail completely at 650° C. in less than 2 hrs. With the TiN barrier in place, the Ti/TiN/Pt/Au metallization system is stable at 650° C. for over 15 hrs. The contact resistivity initially drops within the first hour at room temperature. This is probably due to the alloying of the contacts into the SiC to form TiC. Afterwards the contact resistivity of the Ti/TiN/Pt/Au system increases gradually over the span, while the Ti/Pt/Au system undergoes catastrophic failure. Thus Ti/TiN/Pt/Au is a superior high temperature metallization system on n-type $\beta$-SiC due to the incorporation of the TiN diffusion barrier.

Figure 10:
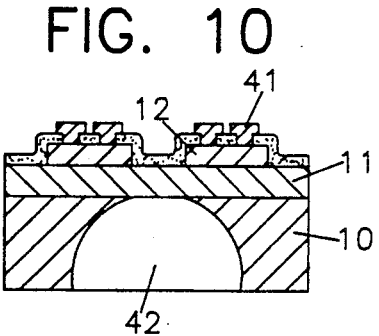
FIG. 10 is a cross-sectional view showing the next step in the method.

The next step in the process is depicted in FIG. 10. In FIG. 10 the silicon wafer which originally was treated is now etched to form a aperture 42 which underlines the P-layer 11. Hence in this manner, the P-layer 11 acts as a diaphragm with the aperture 42 operative as those utilized in the prior art. The back of the composite wafer is patterned with a cup mask and etched using one of the known silicon etchants. The p-type SiC layer 11 acts as a stop etch since it is inert to any chemical etch. Thus the aperture 42 is formed to produce a diaphragm-like structure.

Figure 11:
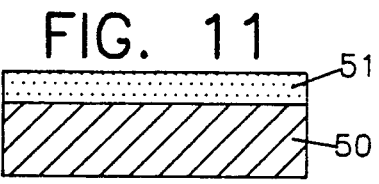
FIG. 11 is a cross-sectional view showing an additional structure used in the method.
Figure 12:
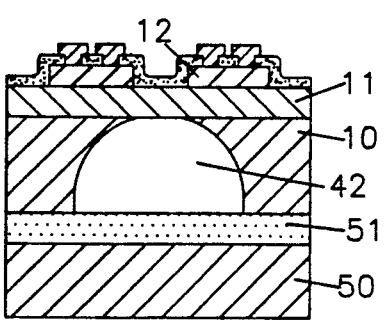
FIG. 12 is a cross-sectional view an additional step in the method.

As shown in FIG. 11, a thick silicon wafer 50 is coated with a glass layer 51. The glass layer 51 can be fabricated from Corning 1729 aluminosilicate glass and annealed at 780° C. in oxygen. The SiC chip or transducer structure shown in FIG. 10 is electrostatically bonded to the wafer as shown in FIG. 12. The electrostatic bond basically is formed by conventional techniques and is well known. It can be bonded to the support wafer by other techniques. The final header is made of any insulating material that has approximately the same expansion coefficient which matches to the silicon. The typical header can be fabricated from alumina silicate machineable ceramic. Such ceramics are screened with moly/manganese paste which is plated with gold. Thus the pins can be applied and the entire assembly can be so utilized.

Figure 13:
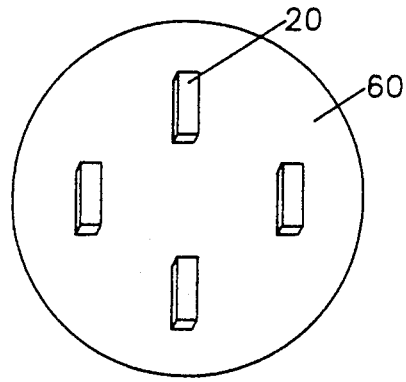
FIG. 13 is a top perspective view of a bridge configuration which can be formed according to the method.
Figure 14:
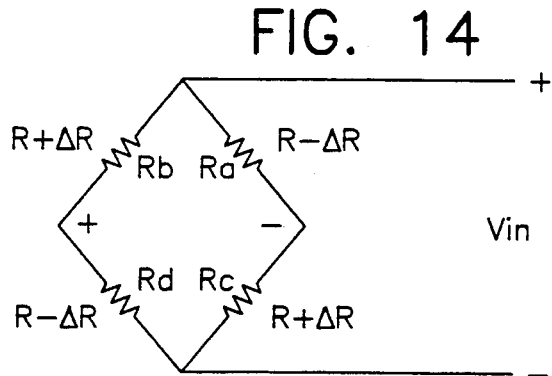
FIG. 14 is a schematic diagram indicative of the structures shown in FIG. 13.

Referring to FIG. 13, there is shown a circular diaphragm fabricated by the above-described techniques utilizing a p-type silicon carbide diaphragm 60 having deposited thereon or formed thereon mesa resistors fabricated from an n-type silicon carbide material. The resistors 20 are shown in FIG. 13 with FIG. 14 showing the equivalent Wheatstone bridge circuit fabricated by the use of the resistors. It has also been indicated that the structure or the mesa resistors shown in FIGS. 13 and 14 can be fabricated utilizing reactive ion etching or plasma etching. In this technique, the n-type SiC layer 11 is masked into a resistor pattern utilizing chromium or another metal mask and is etched using the reactive ion etching or plasma etching techniques which are described in many prior art references, for example see an article by J. W. Palmour et al. in "Science and Technology of Microfabrication" edited by R. E. Howard et al. (MAT RES SOC, PITTSBURGH 1987, Page 185). Unlike the photoelectrochemical techniques described above, reactive ion etching offers no selectivity between n- and p-type SiC and therefore timed etching techniques must be employed. One can also employ p-n hole injection etching and other known techniques.

While the above-described structures depicted diaphragms it is also clear that one can utilize beam transducers. Beam transducers are well known and consist of a cantilever beam or a beam structure which, for example, may be supported at both ends but having transducers implanted or otherwise formed thereon.

We claim:

1. A high temperature pressure transducer, comprising:
   a diaphragm of a predetermined thickness fabricated from a first type of silicon carbide and at least one piezoresistive sensor of a second type of silicon carbide integrally formed on said diaphragm.

2. The pressure transducer according to claim 1, wherein said first type of silicon carbide is p-type with said second type being n-type.

3. The pressure transducer according to claim 1, wherein the thickness of said diaphragm is between 3-20 um.

4. The pressure transducer according to claim 1, wherein said silicon carbide is $\beta$-silicon carbide.

5. The pressure transducer according to claim 1, further including an annular member secured to the surface of said diaphragm opposite said sensor and having a central aperture positioned about said sensor to enable said diaphragm to deflect within said aperture when a force is exerted on said sensor containing surface.

6. The pressure transducer according to claim 5, wherein said annular member is fabricated from silicon.

7. The transducer according to claim 1, wherein said silicon carbide forming said sensor is unintentionally doped silicon carbide.

8. The transducer according to claim 1, wherein said silicon carbide forming said sensor is nitrogen doped silicon carbide.

9. The transducer according to claim 1, wherein said at least one sensor is included in a four sensor Wheatstone bridge configuration with each sensor fabricated from said second type of silicon carbide.

10. The transducer according to claim 1, further including a metal contact formed on said diaphragm coupled to said sensor to enable contact therewith.

11. A method of fabricating a high temperature pressure transducer comprising the steps of:
    growing a first layer of a first type of silicon carbide on the surface of a silicon wafer, said layer having a given thickness;
    growing a thinner layer of a second type of silicon carbide on the surface of said first layer;
    selectively etching said thinner layer of said second type of silicon carbide to form at least one piezoresistive sensor from said thinner layer; and
    forming an aperture in said silicon wafer, said aperture having an area underlying said sensor to allow said first type silicon carbide layer to act as a diaphragm.

12. The method according to claim 11, wherein said step of growing employs chemical vapor deposition of said silicon carbide.

13. The method according to claim 11, wherein said silicon carbide is beta silicon carbide.

14. The method according to claim 11, wherein said first type of silicon carbide is p-type.

15. The method according to claim 11, wherein said second type of silicon carbide is n-type.

16. The method according to claim 11, wherein said layer of first type silicon carbide is between 3-20 um thick.

17. The method according to claim 16, wherein said thinner layer is less than 1.5 um thick.

18. The method according to claim 11, wherein the step of selectively etching includes reactive ion etching said thinner layer.

19. The method according to claim 11, wherein the step of selectively etching includes photoelectrochemical etching said sensor.

20. The method according to claim 11, further including the step of forming contacts on said layer of said first type of silicon carbide after forming said sensor.

21. The method according to claim 20, wherein the step of forming said contacts includes sputtering a metal contact pattern on said layer of silicon carbide.

22. A high temperature pressure sensor, comprising:
    a piezoresistive sensor fabricated from a first type of silicon carbide, and
    a force deflecting member fabricated from a second type of silicon carbide having said sensor mounted thereon.

23. The sensor according to claim 22, wherein said force deflecting member is a diaphragm.

24. The sensor according to claim 22, wherein said force deflecting member is a beam.

* * * * *